(12) United States Patent
Tremaine et al.

(10) Patent No.: US 8,073,007 B2
(45) Date of Patent: Dec. 6, 2011

(54) METHOD AND APPARATUS FOR INTERTECHNOLOGY IPV6 ADDRESS CONFIGURATION

(75) Inventors: Michael C. Tremaine, San Diego, CA (US); Uppinder Singh Babbar, San Diego, CA (US); Vinay Paradkar, Longmont, CO (US)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 12/490,173

(22) Filed: Jun. 23, 2009

(65) Prior Publication Data
US 2009/0323557 A1 Dec. 31, 2009

Related U.S. Application Data

(60) Provisional application No. 61/075,125, filed on Jun. 24, 2008.

(51) Int. Cl.
*H04J 3/16* (2006.01)
(52) U.S. Cl. ........ 370/466; 370/335; 370/331; 370/252; 370/338
(58) Field of Classification Search .................. None
See application file for complete search history.

(56) References Cited

U.S. PATENT DOCUMENTS

| | | | |
|---|---|---|---|
| 6,574,721 B1 * | 6/2003 | Christenson et al. ......... 711/209 |
| 2003/0026230 A1 | 2/2003 | Ibanez et al. |
| 2004/0047340 A1 * | 3/2004 | Ruckstuhl et al. ............ 370/352 |
| 2005/0271032 A1 * | 12/2005 | Yun et al. ...................... 370/349 |
| 2006/0212543 A1 | 9/2006 | O'Farrell et al. |
| 2007/0268919 A1 | 11/2007 | Sarikaya et al. |
| 2010/0031371 A1 * | 2/2010 | Adams et al. ................... 726/27 |
| 2010/0316019 A1 | 12/2010 | Liu et al. |

FOREIGN PATENT DOCUMENTS

EP 1838065 A1 9/2007

OTHER PUBLICATIONS

Cheshire Apple Computer B Aboba Microsoft Corporation E Guttman Sun Microsystems S: "Dynamic Configuration of IPv4 Link-Local Addresses; rfc3927.txt" IEFT Standard, Internet Engineering Task Force, IETF, CH, May 1, 2005, XP015054862 ISSN: 0000-0003 chapters 1-3 (incl.subchapters).
Dave Thaler Christian Huitema Microsoft: "Multi-link Subnet Support in IPv6 <draft-ietf-ipv6-multilink-subnets-OO.txt>; draft-ietf-ipv6-multilink-subnets-00.txt" IETF Standard-Working-Draft, Internet Engineering Task Force, IETF, CH, vol. ipv6, Jun. 29, 2002, XP015002367 ISSN: 0000-0004.
Gundavelli (Editor) K Leung Cisco V Devarapalli Wichorus K Chowdhury Starent Networks B Patil Nokia Siemens Networks S: "Proxy Mobile IPv6; draft-ietf-netlmm-proxymip6-18.txt" IETF Standard-Working-Draft, Internet Engineering Task Force, IETF, CH, vol. netlmm, No. 18, May 30, 2008, XP015056173 ISSN: 0000-0004 p. 9-p. 13; figures 1,2 p. 44-p. 48.

(Continued)

*Primary Examiner* — Duc Chi Ho
(74) *Attorney, Agent, or Firm* — Darren M. Simon

(57) ABSTRACT

Methods and apparatus for resolving incompatible network configurations are described herein. A mobile device having peripheral devices connected thereto receives a request from a peripheral device, determines whether the address configuration protocol associated with the peripheral device is compatible with the network to which the mobile device is connected, and if not compatible, the mobile device translates the address configuration protocol of the peripheral device to one compatible with the network.

19 Claims, 7 Drawing Sheets

OTHER PUBLICATIONS

International Search Report and Written Opinion—PCT/US2009/048515, International Search Authority—European Patent Office—Mar. 10, 2010 (081252WO).

Sarikaya F Xia Huawei Usa B: "Proxy Mobile IPv6 Inter-Technology Handover Issue; draft-sarikaya-netlmm-itho-OO.txt" Proxy Mobile IPV6 Inter-Technology Handover Issue; Draft-Sarikaya-NETLMM-ITHO-00.Txt, Internet Engineering Task Force, IETF; Standardworkingdraft, Internet Society (ISOC) 4, Rue Des Falaises CH- 1205 Geneva, Switzerland, Jun. 3, 2008, XP015059860 the whole document.

Sun Microsystems: "IPv6 Administration Guide" Internet Article, [Online] Apr. 2003, pp. 1-112, XP002547986 Retrieved from the Internet: URL:http://dlc.sun.com/pdf/817-0573/817-05 73.pdf> [retrieved on Sep. 23, 2009] chapter 1.

Thaler M Talwar Microsoft C Patel All Play D et al: "Neighbor Discovery Proxies (ND Proxy); rfc4389.txt" IETF Standard, Internet Engineering Task Force, IETF, CH, Apr. 1, 2006, XP015054955 ISSN: 0000-0003 chapters 1, 3-5 (incl . subchapters).

Thomson Cisco T Narten IBM T Jinmei Toshiba S: "IPv6 Stateless Address Autoconfiguration; rfc4862.txt" IETF Standard, Internet Engineering Task Force, IETF, CH, Sep. 1, 2007, XP015052408 ISSN: 0000-0003.

Yong-Geun Hong Yong-Jin Kim Etri Min-Tae Hwang: "Autoconfiguration of IPv4 Link-Local Addresses in Multilink Networks; draft-hong-zeroconf-multilink-ipv4-00.txt" IETF Standard-Working-Draft, Internet Engineering Task Force, IETF, CH, Nov. 1, 2001, XP015014537 ISSN: 0000-0004 abstract chapters 1-3 (incl . subchapters).

* cited by examiner

METHOD AND APPARATUS FOR INTERTECHNOLOGY IPV6 ADDRESS CONFIGURATION

CLAIM OF PRIORITY UNDER 35 U.S.C. §119

The present Application for Patent claims priority to Provisional Application No. 61/075,125 entitled "Method and Apparatus for Intertechnology IPv6 Address Configuration" filed Jun. 24, 2008, and assigned to the assignee hereof and hereby expressly incorporated by reference herein.

REFERENCE TO CO-PENDING APPLICATIONS FOR PATENT

The present Application for Patent is related to the following co-pending U.S. patent applications: "Method and Apparatus for Ensuring IPv6 Uniqueness in a Mobile Subnetted Environment" Ser. No. 12/490,179, filed concurrently herewith, assigned to the assignee hereof, and expressly incorporated by reference herein.

BACKGROUND

1. Field

This application relates generally to communication, and more specifically to techniques for managing IPv6 addresses between incompatible network configurations.

2. Background

In an Internet Protocol (IP) network, a host communicates with another host via a router. In IP terminology, a "node" is a device that implements IP, a "router" is a node that forwards IP packets not explicitly addressed to itself, and a "host" is a node that is not a router. As used herein, "IP" generically refers to all versions of the Internet Protocol. A host may have one or multiple interfaces to a link. In IP terminology, a "link" is a communication facility or medium over which nodes can communicate at a link layer (which is the layer immediately below IP), and an "interface" is a node's attachment to a link. An interface may be viewed as a network communication port. Each interface is associated with one or more IP addresses that uniquely identify that interface.

Internet Protocol Version 6 (IPv6) is a version of Internet Protocol that is slated to replace the widely used Internet Protocol Version 4 (IPv4). IPv6 resolves some of the key limitations of IPv4. For example, IPv4 utilizes a 32-bit address that was originally thought to provide an ample number of addresses to uniquely identify machines connected to the Internet. However, the explosive growth of the Internet has created a real risk of running out of IPv4 addresses. IPv6 ameliorates this concern by utilizing a 128-bit address.

IPv6 also provides other improvements over IPv4. For example, IPv6 supports "stateless address autoconfiguration", which is a process whereby a host can automatically configure its own IPv6 address(es). Stateless address configuration can avoid the need to manually configure each host before connection to a network, eliminate the need for a dedicated server to administer and assign addresses to hosts on the network, and facilitate renumbering of addresses for hosts on the network.

The stateless address autoconfiguration in IPv6 allows for nodes to generate multiple addresses, such as "privacy addresses," as defined in RFC 3041. Addresses are formed by generating a random Interface ID (IID) and associating it with the network prefix of the current access router. When on a broadcast network it is necessary to validate that there is no other node using the newly generated IID. This procedure is called Duplicate Address Detection (DAD). This process of generating and validating addresses can however differ depending upon the type of network connection present. In broadcast networks utilizing stateless address autoconfiguration, two ICMPv6 (Internet Control Message Protocol version 6) packets are defined to facilitate this process, a neighbor solicitation (NS) and a neighbor advertisement (NA). Utilizing these two messages, the DAD process mentioned previously may be performed for standard IPv6 broadcast links. These messages are however insufficient, when connecting devices using incompatible network configurations.

Often external devices rely on mobiles for their network connectivity. Unfortunately there can be issues associated with interfacing some devices with networks that support different address configuration protocols. It would be desirable to have a method for addressing incompatible network configurations.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to some aspects, a method for resolving incompatible network configurations comprises receiving a request, at a mobile device, from at least one peripheral device connected to the mobile device for external internet protocol (IP) connectivity; determining, whether an address configuration protocol associated with the peripheral device is compatible with an address configuration protocol associated with a network to which the mobile device is connected; assigning an address to the peripheral if its address configuration protocol is compatible with the address configuration protocol associated with the network; and translating the address configuration protocol associated with the peripheral device to a format compatible with the address configuration protocol associated with the network if the address configuration protocols are not compatible.

According to some aspects, an apparatus comprises a receiver for receiving a request for external internet protocol (IP) connectivity from at least one peripheral device connected to the apparatus; and an address translator for determining whether an address configuration protocol associated with the peripheral device is compatible with an address configuration protocol associated with a network to which the apparatus is connected, wherein the address translator is further configured to assign an address to the peripheral device if its address configuration protocol is compatible with the address configuration protocol associated with the network, and to translate the address configuration protocol associated with the peripheral device to a format compatible with the network if the address configuration protocols are not compatible.

According to some aspects, at least one processor configured to resolve incompatible network configurations, comprises a first module for receiving a request, at a mobile device, from at least one peripheral device connected to the mobile device for external internet protocol (IP) connectivity; a second module for determining, whether an address configuration protocol associated with the peripheral device is compatible with an address configuration protocol associated with a network to which the mobile device is connected; a third module for assigning an address to the peripheral device if its address configuration protocol is compatible with the address configuration protocol associated with the network; and a fourth module for translating the address configuration protocol associated with the peripheral device to a format compatible with the address configuration protocol associated with the network if the address configuration protocols are not compatible.

According to some aspects, a computer program product comprising a computer-readable medium comprises a first set of codes for causing a computer to receive a request from at least one peripheral device for external internet protocol (IP) connectivity; a second set of codes for causing the computer to determine whether an address configuration protocol associated with the peripheral device is compatible with an address configuration protocol associated with a network to which the peripheral device wishes to connect; a third set of codes for causing the computer to assign an address to the peripheral device if its address configuration protocol is compatible with the address configuration protocol associated with the network; and a fourth set of codes for causing the computer to translate the address configuration protocol associated with the peripheral device to a format compatible with the address configuration protocol associated with the network if the address configuration protocols are not compatible.

According to some aspects, an apparatus comprises means for receiving a request, at a mobile device, from at least one peripheral device connected to the mobile device for external IP connectivity; means for determining, whether an address configuration protocol associated with the peripheral device is compatible with an address configuration protocol associated with a network to which the mobile device is connected; means for assigning an address to the peripheral device if its address configuration protocol is compatible with the address configuration protocol associated with the network; and means for translating the address configuration protocol associated with the peripheral device to a format compatible with the address configuration protocol associated with the network if the address configuration protocols are not compatible.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
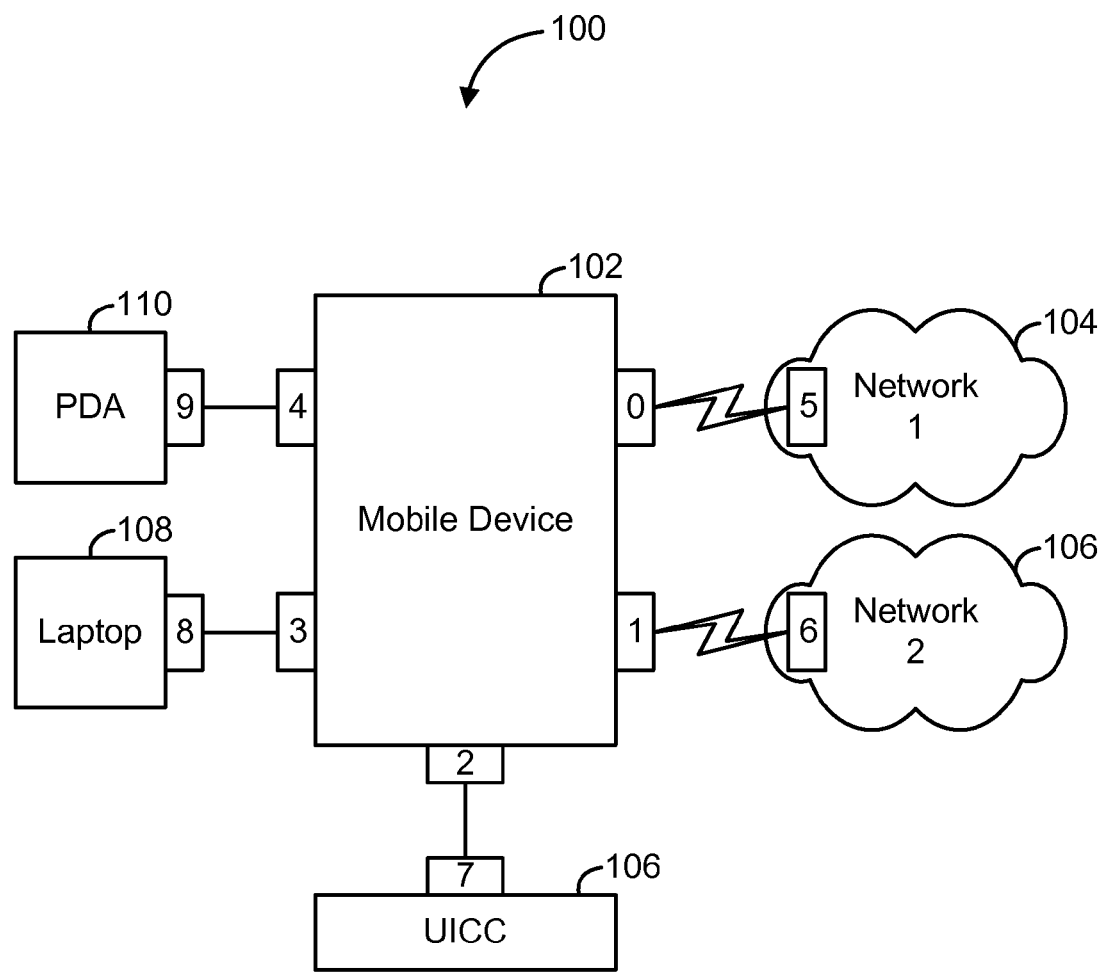
FIG. 1 is a block diagram depicting an internetworking architecture, in accordance with various aspects.

More particularly, apparatus and methods will now be described wherein a mobile device provides an interface for peripheral devices and networks which may support different address configuration protocols. Addresses may be translated from one configuration to another, allowing seamless integration such that the peripheral devices need not understand the multitude of different mobile technologies and configuration protocols. The mobile device may be configured to rack the usage of configured addresses to prevent the unnecessary tie up of resources which are no longer in use FIG. 1 depicts an internetworking architecture 100, in accordance with various disclosed aspects. A mobile device 102 may be communicatively coupled to a first network 104 and a second network 106 over a wireless or wired link. Mobile device 102 may be, for example, a mobile telephone, a personal digital assistant, or any other mobile device. Moreover, while a mobile device is described herein, it is noted that the described systems, methods, and apparatus may also be implemented by a fixed electronic device, such as a desktop personal computer. While two networks are depicted, this configuration is merely exemplary. Mobile device 102 may be configured to communicate with any number of networks. Each of first network 104 and second network 106 may be, for example, an intranet, the Internet, a local area network, a 3GPP2 network such as cdma2000, a 3GPP network, a WiMax network, a wireless local area network (WLAN) and/or any other network.

Mobile device 102 may have connected thereto a plurality of peripheral devices. The peripheral device may be external or internal devices. For example, a first peripheral device may be UICC device 106 (e.g., a SIM card), which may be internal to the mobile device 102. Mobile device 102 may also have connected thereto a plurality of external device, such as, for example, a laptop 108 and a personal digital assistant (PDA) 110.

Mobile device 102 may include a plurality of interfaces for communicating with the plurality of peripheral devices and connecting to the networks. As depicted in FIG. 1, interface "0" provides a connection to first network 104, while interface "1" provides a connection to second network 106. Interface "2" connects to UICC device 106, interface "3" connects to laptop 108, and interface "4" connects to PDA 110. Each device also comprises an interface for communicating with the mobile device 102, as indicated by interfaces 5-9. The network interfaces may be used to connect to a router used to connect to the mobile device 102.

Each interface may have associated therewith one or more IP addresses for communicating. According to some aspects, the mobile device 102 and each peripheral device may generate a link-local IP address for communicating with all directly connected devices using stateless address auto-configuration. That is, mobile device 102 may generate a link-local IP address for communicating with each of UICC device 106, laptop 108, and PDA 110. Each of UICC device 106, laptop 108, and PDA 110 may generate a link-local IP address for communicating with the mobile device 102 and each other.

According to some aspects, the link-local IP addresses may be IPv6 addresses. As described above, IPv6 address are 128-bit addresses, wherein the lower 64 bits may represent an interface identifier (IID) and the upper 64 bits may represent a prefix. For link-local communications, the prefix may be the well-known link-local prefix 0xFE80, as specified by the stateless autoconfiguration specification. The IIDs may be randomly generated by each device.

According to some aspects, UICC device 106, laptop 108, and PDA 110 may be configured to connect to first network 104 and second network 106. As such, these devices also need an IP address for global communications in addition to the IP address established for link-local connectivity. According to some aspects, the mobile device 102 may be configured to establish a connection to first network 104 and/or second network 106. The selected network provides a global prefix and address for use by the mobile device when communicating with the network. The mobile device 102 may be configured to provide the global prefix to each peripheral device, and the peripheral device may generate a global address by prepending the global prefix to its self generated IID.

Figure 2:
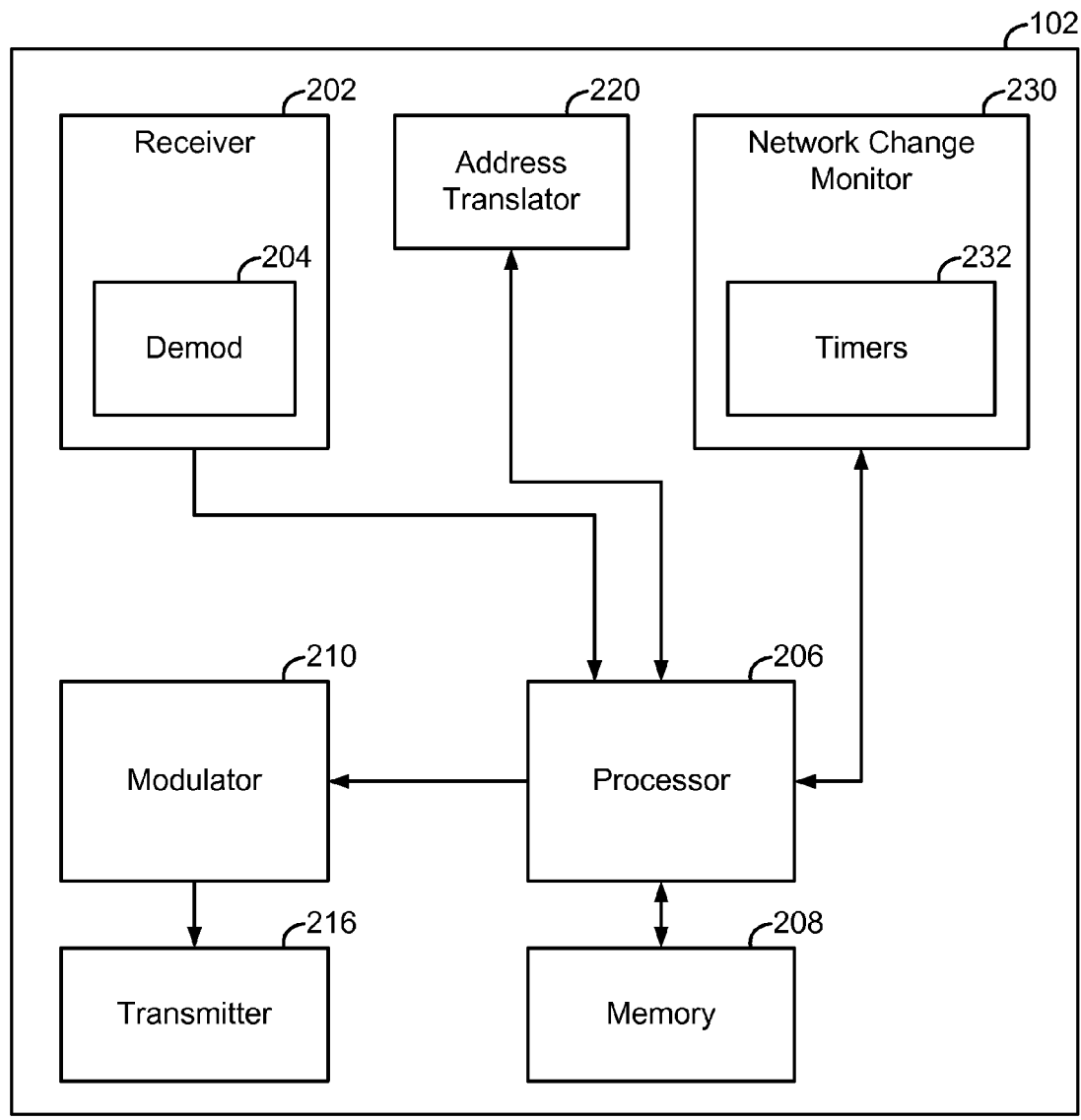
FIG. 2 is a block diagram depicting a mobile device, in accordance with various aspects.

FIG. 2 depicts mobile device 102 in greater detail. Mobile device 102 may comprise a receiver 202 that receives a signal from, for example, a receive antenna (not shown), performs typical actions (e.g., filters, amplifies, downconverts, etc.) the received signal, and digitized the conditioned signal to obtain samples. Mobile device 102 may also comprise a demodulator 204 that can demodulate received symbols and provide them to a processor 206. Processor 206 may be a processor dedicated to analyzing information received by receiver 202 and/or generating information for transmission by a transmitter 216, a processor that controls one or more components of mobile device 102, and/or a processor that both analyzes information received by receiver 202, generates information for transmission by transmitter 216, and controls one or more components of mobile device 102.

Mobile device 102 may additionally comprise memory 208 that is operatively coupled to processor 206 and that can store data to be transmitted, received data, information related to network connectivity, and/or any other suitable information. Mobile device 102 may additionally store protocols and/or algorithms associated with network connectivity or other functions performed by mobile device 102. It will be appreciated that memory 208 may be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PRROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 208 is intended to comprise, without being limited to, these and any other suitable types of memory.

Processor 206 may further be operatively coupled to an address translator 220 and a network change monitor 230. Address translator 220 may be configured to determine the type of access technology employed both by any attached peripheral devices as well as the network to which the mobile device has established a connection. The address translator 220 may be configured to detect network incompatibilities, and can re-format network addresses to ensure compatibility.

Network change monitor 230 may be configured to monitor the status and configuration of the network and any connected peripheral devices. The network change monitor 230 may report these changes to the network. According to some aspects, the network change monitor 230 may employ a plurality of timers 232, which may be used to monitor whether an address associated with a particular peripheral device is still valid.

Figure 3:
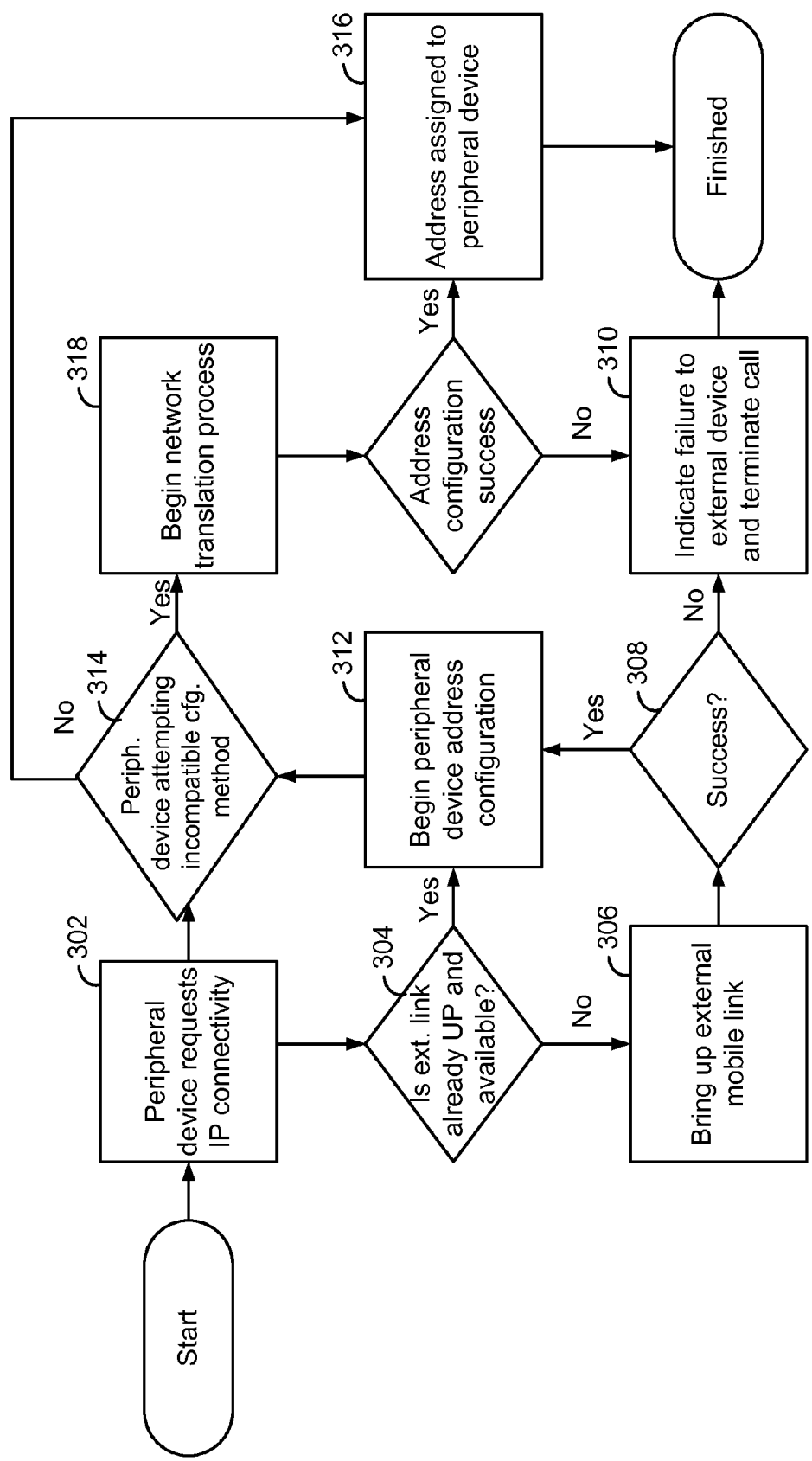
FIGS. 3-5 are flowcharts depicting an exemplary address incompatibility resolution process, in accordance with various disclosed aspects.

FIG. 3 depicts an overall process for translating address configuration packets received from a peripheral device into a format compatible with the network depending upon the specific network type to which the mobile device is currently connected. This ensures that the peripheral device's address will be properly verified on the network. As depicted at 302, the mobile device may receive a request from a peripheral device for external network connectivity. The mobile device then determines whether its external link is already up and available, as depicted at 304. That is, the mobile device determines whether it has already established a connection to an external network.

If the mobile device's IP connectivity has not yet been established, the mobile device attempts to bring up the connection, as depicted at 306. At 308, a determination is made as to whether the mobile device was able to successfully bring up a network connection. If the mobile device was not successful, as depicted at 310, the device mobile device indicates a connection failure to the peripheral device, and terminates the call. The mobile device may be unsuccessful at configuring an address for various reasons such as, for example, a timeout for inability to configure network addresses, inability to negotiate desired parameters, the device is unauthorized, a lack of network resources, and/or any other reason.

Once the mobile has successfully configured a network connection, the mobile device and the peripheral device work together to attempt to configure an address for the peripheral device, as depicted at 312. When establishing a connection to the network, the mobile device is provided a global prefix for use in communicating with the network. To configure an address for the peripheral device, the mobile device provides the global prefix to the peripheral device. The peripheral device generates an interface identifier (IID), and appends the IID to the global prefix to generate its IPv6 address.

As depicted at 314, the mobile device determines whether the peripheral device is attempting a configuration method which is incompatible with the mobile device's external network connection. For example, if the peripheral device employs Simple IPv6, its attempts to configure a network address with a network employing mobile IPv6 will be unsuccessful. Determining whether a configuration method is incompatible with the mobile device's external network connection may be based on address configuration packets received from the peripheral device. For example, an address configuration packet originating from a peripheral device employing Simple IPv6 may be a neighbor solicitation (NS) packet in order to perform duplicate address detection (DAD). Mobile IPv6, however, may use different configuration packets in order to perform DAD. Thus, this configuration attempt would be incompatible. If an incompatible configuration attempt is not detected, the peripheral device is assigned an IP address, as depicted at 316. More particularly, the mobile device may provide the peripheral device with the global prefix assigned for communicating with the network. The peripheral device may then configure an IP address by appending its self-generated IID to the global prefix.

Figure 4:
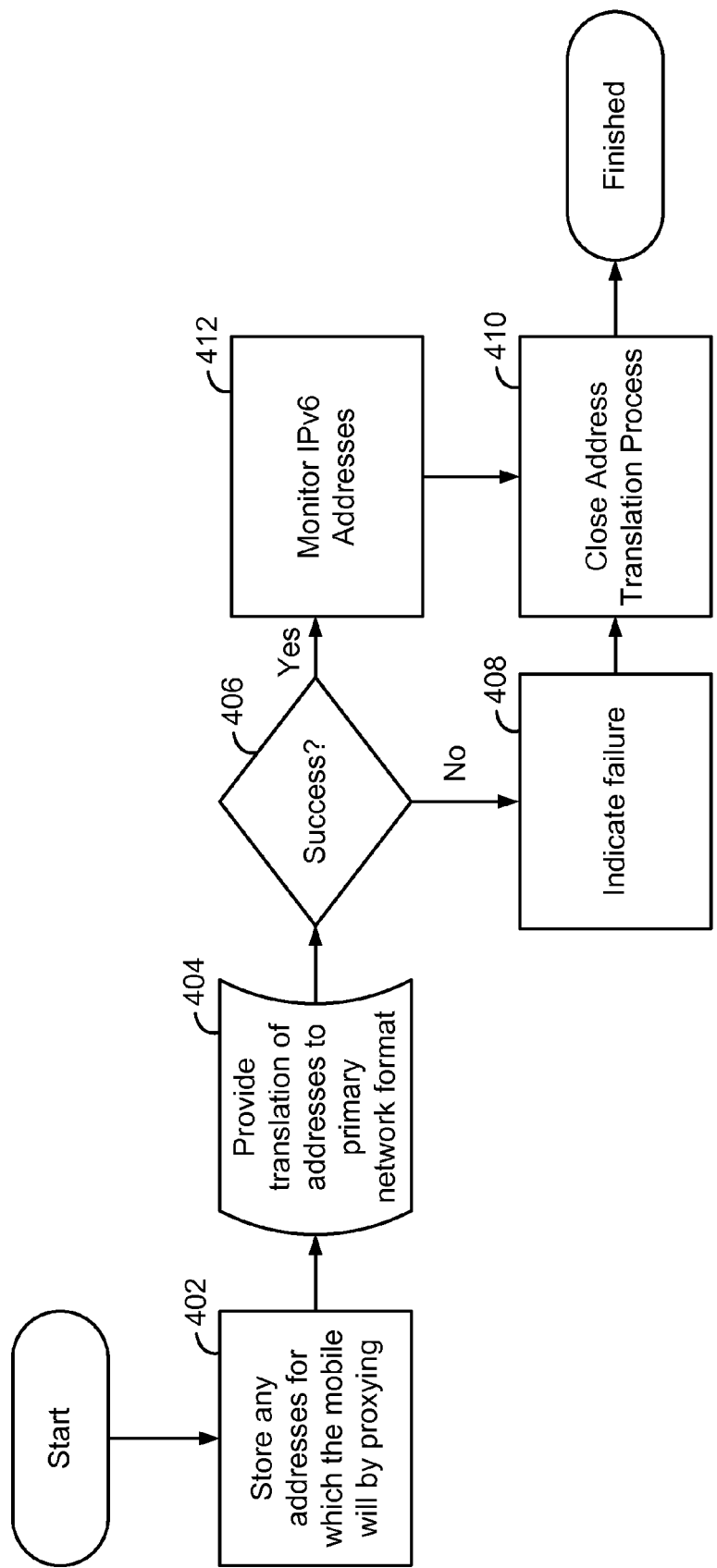

If an incompatible configuration attempt is detected, the mobile device may begin a network translation process, as depicted at 318. This process is depicted in greater detail in FIG. 4. As depicted at 402, the mobile device may store any addresses for which the mobile device will be serving as a proxy. The mobile device may be configured to extract address information from an incoming address configuration packet from the peripheral device. For Simple IPv6, this may include extracting the IID generated by the peripheral device and storing it in a table.

As depicted at 404, the mobile device may translate the address configuration packet to a network configuration protocol message specific to the type of network to which the mobile device is currently connected. For example, the mobile device may translate an IPv6 address configuration packet into a Mobile IPv6 registration packet. More particularly, the mobile device may wrap the extracted IID into a mobile IPv6 registration packet. The mobile device may then register the address with the network's home agent. This allows the home agent needs to tunnel all data destined for that address to the mobile device. The home agent may then perform proxy DAD for that address. If the proxy DAD succeeds, the address is unique on the home network, and the home agent may notify the mobile device via a registration response.

At step 406, it is determined whether the mobile device was able to successfully translate the network configuration request. If not, configuration failure is indicated to the peripheral device, as depicted at 408, and the address translation process ends, as depicted at 410.

Figure 5:
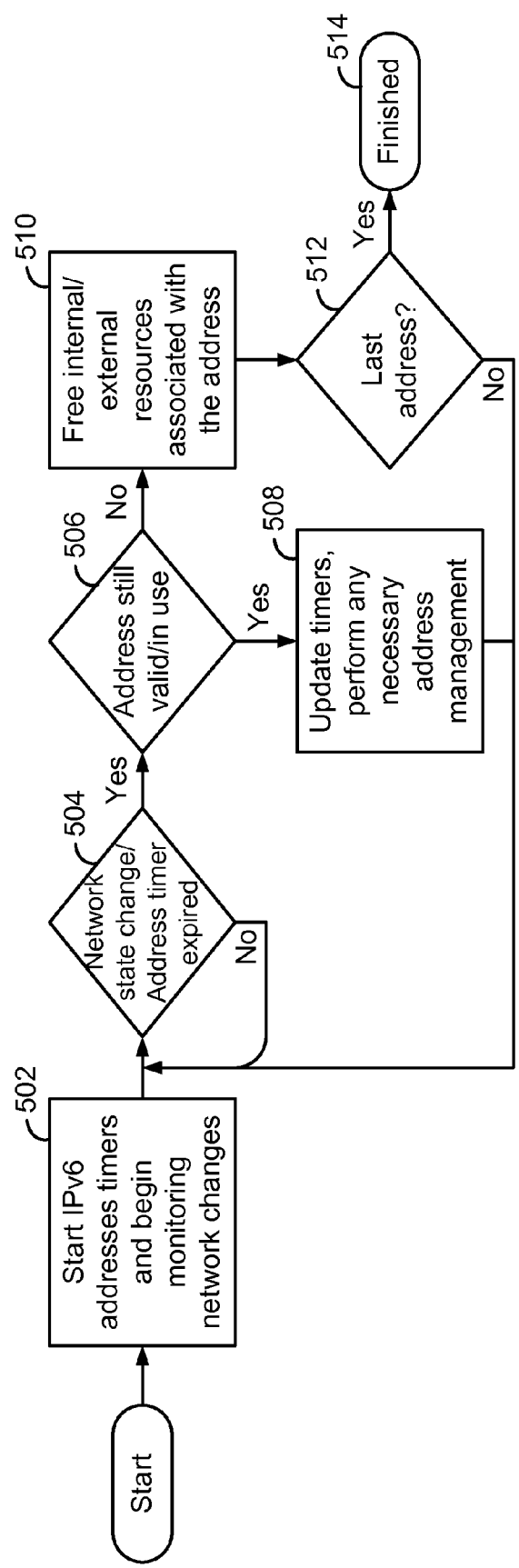

If the mobile device is able to successfully translate the address configuration request, the mobile device now acts as a proxy for the peripheral device. Thus, as depicted at 412, the mobile device monitors all IPv6 addresses for which it is serving as a proxy. Monitoring may include ensuring that the peripheral device is still connected and notifying the network if a peripheral device for which the mobile device is serving as a proxy has disconnected. Monitoring may additionally include looking for new address allocations for the peripheral devices which may be indicated by additional NSs. The mobile device may also monitor for handoffs, and may inform the new network of all addresses for the peripheral devices for which the mobile device is acting as a proxy. The monitoring process is depicted in greater detail in FIG. 5.

As depicted at 502, the mobile device may start an IPv6 address timer for each peripheral device, or for each address associated with the peripheral device if the peripheral device has multiple addresses, for which it is serving as a proxy. The address timer may be set for a predetermined time period, and may be renewed periodically by the mobile device once it is determined that the peripheral device associated with the address is still connected. Determining that the peripheral device associated with the address may be based on monitoring packets for the peripheral device, or determining whether additional NAs or neighbor solicitations are received for the address. The timer may be allowed expire once the peripheral device is no longer connected, and the address associated with the device then becomes invalid.

In addition to monitoring the address timers, the mobile device may also be configured to monitor for network changes. Network changes may include, for example, a handoff from one packet data serving network (PDSN) to another within a particular network, a inter-technology handoff from one network type to another, and/or any other network changes. As depicted at 504, a determination is made as to whether there has been a network state change or an address timer expiration. If neither has occurred, the monitoring continues.

If a network state change or an address timer expiration has occurred, the mobile device determines whether the address associated with the peripheral device is still valid for in use, as depicted at 506. For example, if the mobile device has detected a handoff from a CDMA network to a UTMS network, the address associated with the mobile device may not remain valid, as the prefix portion of the address is owned by the network. The IID portion of the address may be retained by the mobile device or the peripheral device. Moreover, all addresses associated with a peripheral device may be invalid if the peripheral device is no longer connected to the mobile device. If the address is still valid and in use, the mobile device may refresh the timer, if needed, and perform any needed address management, as depicted at 508.

If it is determined that an address is invalid or no longer in use, the mobile device may free any internal resources associated with the address, and may instruct the network to free up any external resources associated with the address, as depicted at 510. For example, in mobile IPv6, the mobile device may send a bind update (BU) message indicating null binding to inform the network that the address is no longer in use. The mobile device may be serving as a proxy for multiple addresses. Accordingly, as depicted at 512, it is determined whether the recently invalidated address is the last address being monitored. If so, the process ends, as depicted at 514. If it is not the last address, monitoring continues at step 504.

Figure 6:
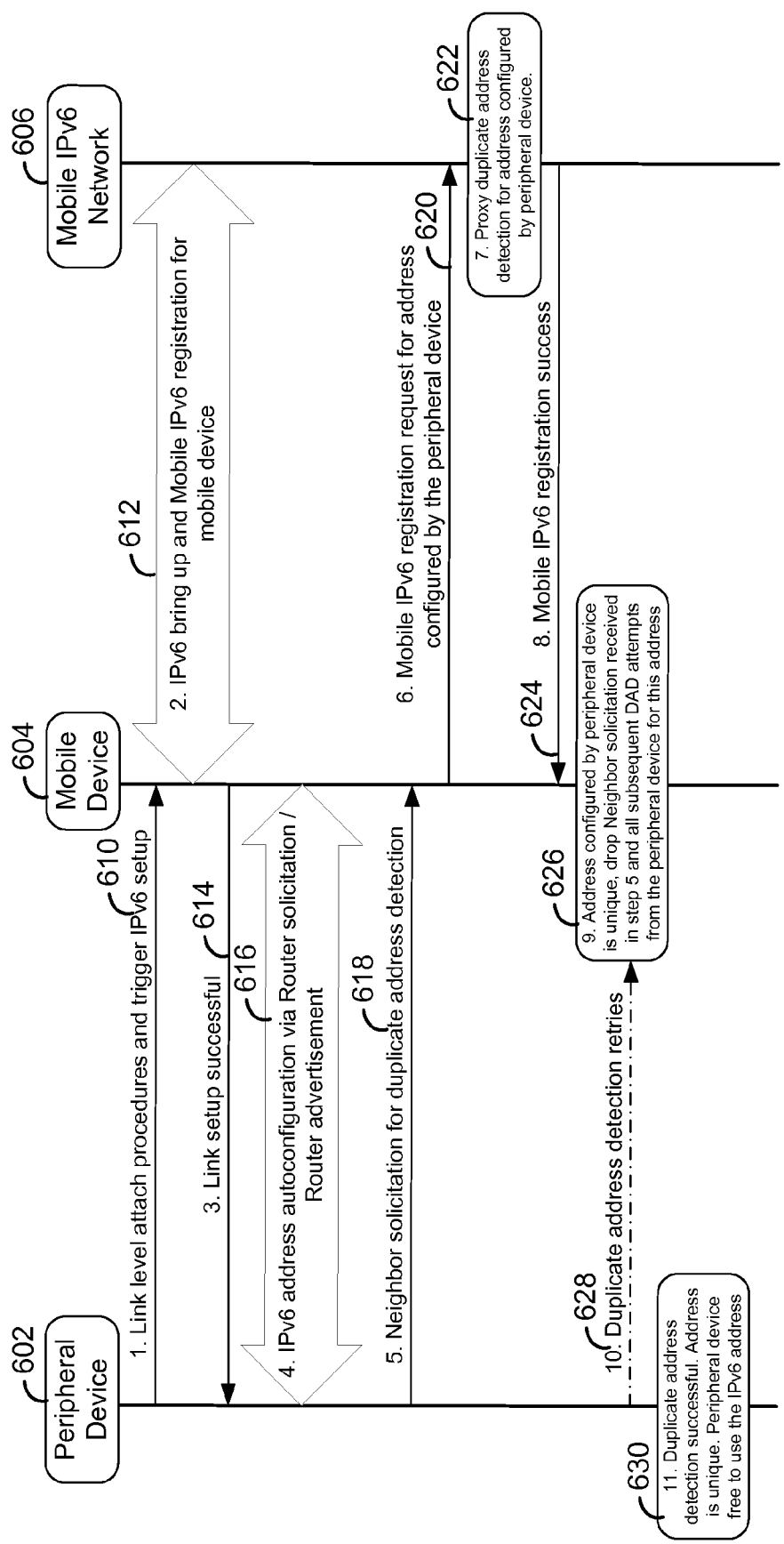
FIG. 6 is a call flow diagram depicting an exemplary address incompatibility resolution process, in accordance with various disclosed aspects

FIG. 6 is a message flow diagram depicting an exemplary message flows between a peripheral device 602, a mobile device 604 to which the peripheral device 602 is connected, and a mobile IPv6 network 606. Peripheral device 602 may employ a simple IPv6 protocol. Thus, peripheral device 602 and mobile IPv6 network 606 use incompatible address configuration procedures. It is noted that the use of mobile IPv6 in network 606 and simple IPv6 in peripheral device 602 is merely exemplary. The techniques described are equally applicable to any incompatible protocols.

As depicted at 610, the peripheral device 602 performs link-level attach procedures with the mobile device 604, which triggers the mobile device to configure its own IPv6 connection. Performing link-level attach procedures may include connecting to the mobile device, for example, through a USB connection.

As depicted at 612, the mobile device 604 contacts mobile IPv6 network 606 to configure its IPv6 and Mobile IPv6 addresses, and to register the Mobile IPv6 address with the network. During this process, mobile IPv6 network 606 may provide mobile device 604 with a network prefix. According to some aspects, the mobile device 604 may self generate an IID to be combined with the network prefix in generating an IPv6 address. In other aspects, the network may assign both the network prefix and an IID to the mobile device 604.

As depicted at 614, the peripheral device 602 may determine that its link setup is successful and it is able to communicate with the mobile device 604. As depicted at 616, the peripheral device 602 and mobile device 604 may communicate to perform IPv6 address auto-configuration procedures. To provide IP connectivity to the peripheral device 602, the mobile device 604 acts as a router. The peripheral device 602 may send a router solicitation message to the mobile device 604, requesting a router advertisement. Alternatively, the peripheral device 602 may simply wait to receive a router advertisement from the mobile device 604 as these messages are sent periodically as multicast messages. The router advertisement may be used by the mobile device 604 to advertise its mobile IPv6 prefix to the peripheral device 602.

As depicted at 618, the peripheral device, which in this example uses simple IPv6, may send a neighbor solicitation for duplicate address detection to ensure that the address it has configured is not a duplicate, and is therefore usable. Upon receipt of the neighbor solicitation, the mobile device may translate the neighbor solicitation into a mobile IPv6 registration request for the address configured by the peripheral device, as depicted at 620. The registration request may be forwarded to the home agent of the mobile IPv6 network.

When the home agent receives the registration request, it may perform a proxy duplicate address detection for the address configured by the peripheral device, as depicted at 622. Once it is determined that the address is unique on the mobile IPv6 network, the home agent notifies the mobile device that the registration was successful, as depicted at 624. As depicted at 626, upon receipt of notification that the mobile IPv6 registration was successful, the mobile device 604 may drop any further DAD requests from peripheral device 602. The peripheral device may continue to send duplicate address detection retries, as depicted at 628. For example, the peripheral device may send additional neighbor solicitations for a preconfigured number of tries until it times out. As depicted at 630, if the peripheral device 602 does not receive a response from the mobile device 604 after the preconfigured number of tries, the peripheral device assumes that the DAD was successful, and that its address is unique and usable.

Figure 7:
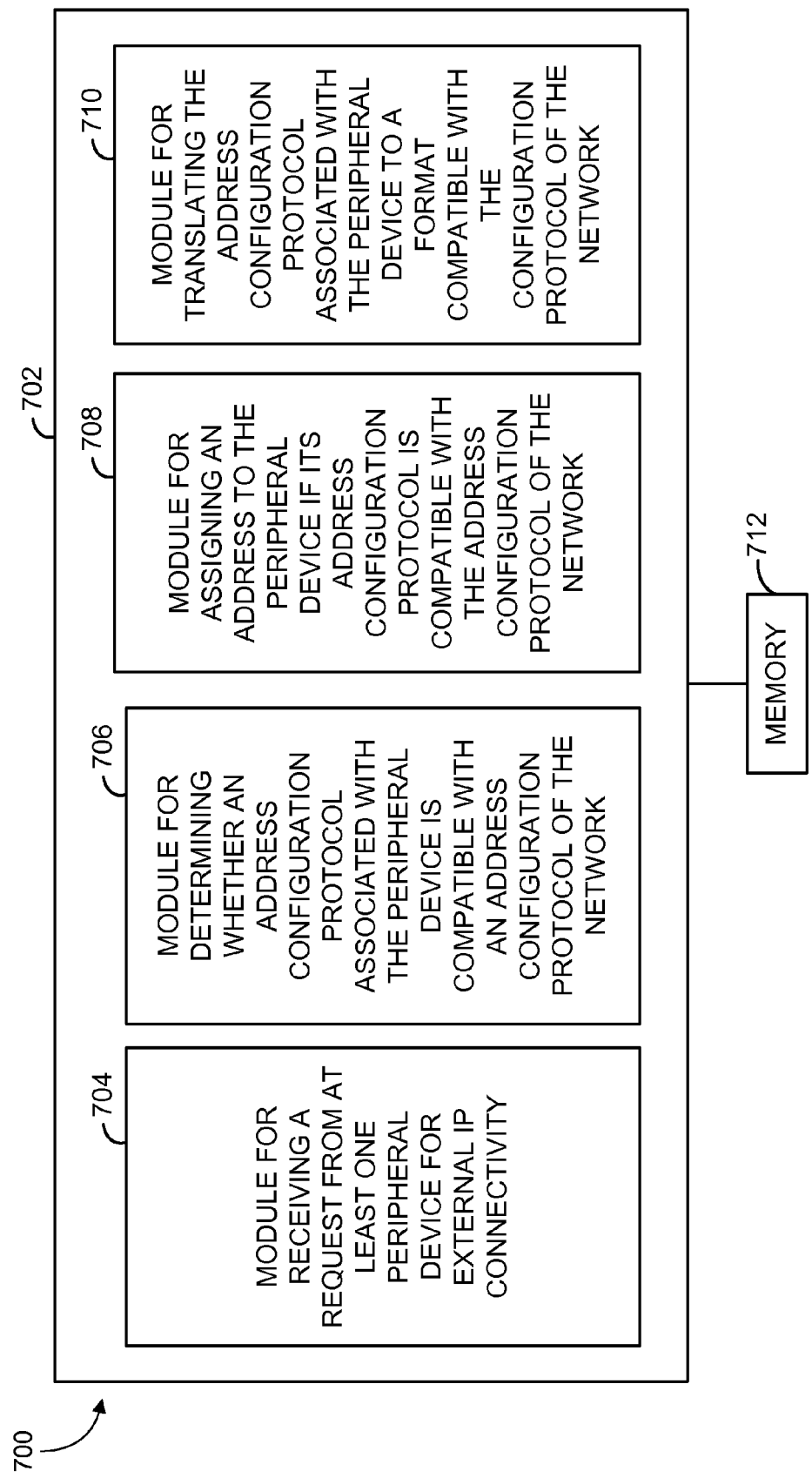
FIG. 7 is an illustration of an example methodology that facilitates address incompatibility resolution process, in accordance with some aspects.

Turning to FIG. 7, illustrated is a system 700 for ensuring network address uniqueness. As depicted, system 700 includes functional blocks that can represent functions implemented by a processor, software, or combination thereof (e.g., firmware). System 700 includes a logical grouping 702 of electrical components that act in conjunction. System 700 may be implemented, for example, by a mobile device. Logical grouping 702 can include a module for receiving a request from at least one peripheral device for external internet protocol (IP) connectivity 704. Moreover, logical grouping 702 can include a module for determining, whether an address configuration protocol associated with the peripheral device is compatible with an address configuration protocol associated with a network to which the mobile device is connected 706. The logical grouping 702 may also include a module for assigning an address to the peripheral device if its address configuration protocol is compatible with the address configuration protocol associated with the network 708. The logical grouping 702 may further comprise a module for translating the address configuration protocol associated with the peripheral device to a format compatible with the address configuration protocol associated with the network if the address configuration protocols are not compatible 710. Additionally, system 700 can include a memory 712 that retains instructions for executing functions associated with electrical components 704, 706, 708, and 710. While shown as being external to memory 612, it is to be understood that electrical components 704, 706, 708, and 710 can exist within memory 712.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM , etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for resolving incompatible network configurations, comprising:
   receiving a request, at a mobile device, from at least one peripheral device connected to the mobile device for external internet protocol (IP) connectivity;
   determining whether an address configuration protocol associated with the at least one peripheral device is compatible with an address configuration protocol associated with a network to which the mobile device is connected;
   translating the address configuration protocol associated with the at least one peripheral device to a format compatible with the address configuration protocol associated with the network if the address configuration protocols are not compatible; and
   assigning a global address prefix to the at least one peripheral device upon successful translation of the address configuration protocol associated with the at least one peripheral device, wherein the address associated with the at least one peripheral device is an internet protocol version 6 (IPv6) address.

2. The method of claim 1, wherein translating the address configuration protocol comprises:
   extracting an address and configuration data associated with the at least one peripheral device from an incoming configuration packet and storing the address in a proxy address table;
   generating, based on the extracted address and configuration data, a configuration packet compatible with the network;
   and transmitting the compatible configuration packet to the network on behalf of the at least one peripheral device.

3. The method of claim 2, wherein the at least one peripheral device uses simple IPv6 and the address configuration protocol associated with the at least one peripheral device uses a Neighbor Solicitation (NS) packet to perform duplicate address detection (DAD), and wherein the mobile device communicates with the network using mobile IPv6.

4. The method of claim 3, further comprising:
   registering the address associated with the network's home agent, wherein the home agent performs a proxy DAD operation to ensure that the address is unique on the network.

5. The method of claim 1, further comprising:
   configuring a timer associated with the at least one peripheral device, the timer used to verify the validity of an address associated with the at least one peripheral device;
   monitoring the network for any changes associated with the mobile device or the at least one peripheral device;
   reporting, to the network, any detected changes; and
   if the timer has expired, reporting to the network that the address associated with the at least one peripheral device is invalid.

6. The method of claim 5, wherein a state change comprises a handoff from a first PDSN to a second PDSN.

7. The method of claim 5, wherein a state change comprises an inter-technology handoff.

8. The method of claim 5, wherein if the address associated with the at least one peripheral device is invalid, the method further comprises:
- removing the address from an address proxy table; and
- instructing the network to free any resources associated with the address.

9. The method of claim 1, wherein the network to which to mobile device is connected comprises one of a CDMA network, a UMTS network, a WCDMA network, a mobile IPv6 network, a WLAN, an LTE network, and a WIMAX network.

10. An apparatus, comprising:
- a receiver for receiving a request for external internet protocol (IP) connectivity from at least one peripheral device connected to the apparatus;
- an address translator for determining, whether an address configuration protocol associated with the at least one peripheral device is compatible with an address configuration protocol associated with a network to which the apparatus is connected,
- wherein the address translator is further configured to translate the address configuration protocol associated with the at least one peripheral device to a format compatible with the address configuration protocol associated with the network if the address configuration protocols are not compatible, and to assign a global address prefix to the at least one peripheral device upon successful translation of the address configuration protocol associated with the at least one peripheral device, wherein the address associated with the at least one peripheral device is an internet protocol version 6 (IPv6) address.

11. The apparatus of claim 10, further comprising:
- a storage device,
- wherein the address translator is further configured to extract an address and configuration data associated with the at least one peripheral device from an incoming configuration packet, store the address in a proxy address table in the storage device, generate, based on the extracted address and configuration data, a configuration packet compatible with the network, and transmit the compatible configuration packet to the network on behalf of at least one the peripheral device.

12. The apparatus of claim 11, wherein the at least one peripheral device uses simple IPv6 and the address configuration protocol associated with the at least one peripheral device is a duplicate address detection (DAD) packet, and wherein the mobile device communicates with the network using mobile IPv6.

13. The apparatus of claim 10, further comprising:
- a network change monitor for monitoring the status and configuration of the network and the at least one peripheral device, wherein the network change monitor comprises a timer associated with the at least one peripheral device, the timer used to verify the validity of an address associated with the at least one peripheral device, and
- wherein the network change monitor is configured to report to the network any changes in network state and to report to the network that the address associated with the at least one peripheral device is invalid if the timer has expired.

14. The apparatus of claim 13, wherein a state change comprises a handoff from a first PDSN to a second PDSN.

15. The apparatus of claim 13, wherein a state change comprises an inter-technology handoff.

16. The apparatus of claim 13, wherein the network change monitor is configured to remove the address from an address proxy table and to instruct the network to free any resources associated with the address if the address associated with the at least one peripheral device is invalid.

17. The apparatus of claim 10, wherein the network to which to mobile device is connected comprises one of a CDMA network, a UMTS network, a WCDMA network, a mobile IPv6 network, a WLAN, an LTE network, and a WIMAX network.

18. At least on processor configured to resolve incompatible network configurations, comprising:
- a first module for receiving a request, at a mobile device, from at least one peripheral device connected to the mobile device for external internet protocol (IP) connectivity;
- a second module for determining, whether an address configuration protocol associated with the at least one peripheral device is compatible with an address configuration protocol associated with a network to which the mobile device is connected;
- a third module for assigning a global address prefix to the at least one peripheral device if its address configuration protocol is compatible with the address configuration protocol associated with the network; and
- a fourth module for translating the address configuration protocol associated with the at least one peripheral device to a format compatible with the address configuration protocol associated with the network if the address configuration protocols are not compatible, wherein the address associated with the at least one peripheral device is an internet protocol version 6 (IPv6) address.

19. An apparatus, comprising:
- means for receiving a request, at a mobile device, from at least one peripheral device connected to the mobile device for external internet protocol (IP) connectivity;
- means for determining, whether an address configuration protocol associated with the at least one peripheral device is compatible with an address configuration protocol associated with a network to which the mobile device is connected;
- means for translating the address configuration protocol associated with the at least one peripheral device to a format compatible with the address configuration protocol associated with the network if the address configuration protocols are not compatible;
- means for assigning a global address protocol to the at least one peripheral device upon successful translation of the address configuration protocol, wherein the address associated with the at least one peripheral device is an internet protocol version 6 (IPv6) address.

* * * * *